April 21, 1953

C. F. ENGELHARDT 2,635,933

PISTON RING CONSTRUCTION

Filed Sept. 28, 1949

INVENTOR.
Carl F. Engelhardt
BY
Leonard L. Kalish
Attorney

April 21, 1953   C. F. ENGELHARDT   2,635,933
PISTON RING CONSTRUCTION
Filed Sept. 28, 1949   3 Sheets-Sheet 2
Fig. 3
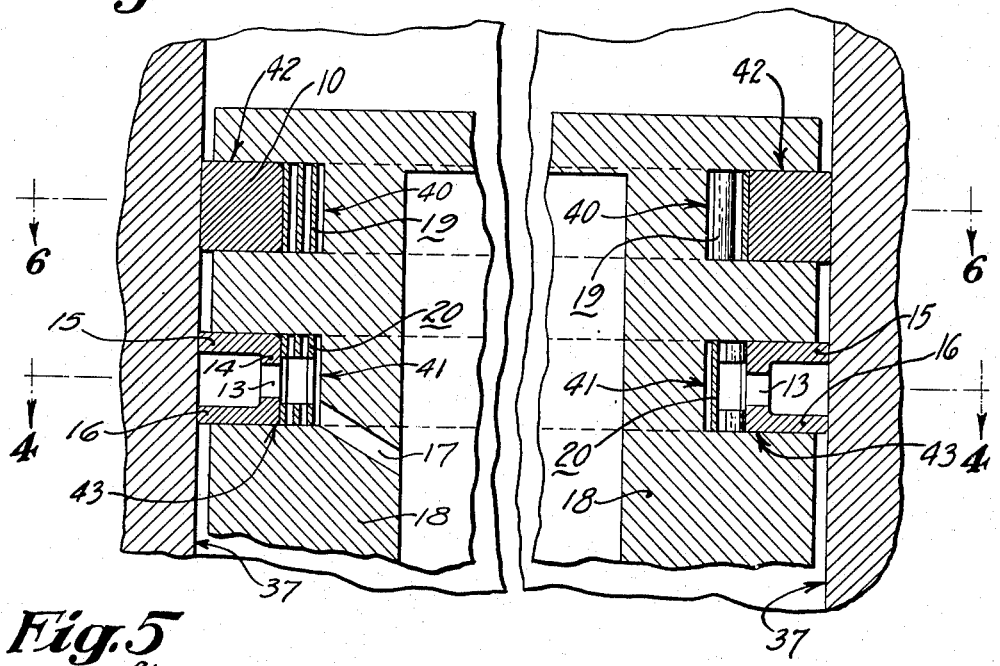
Fig. 5
Fig. 4
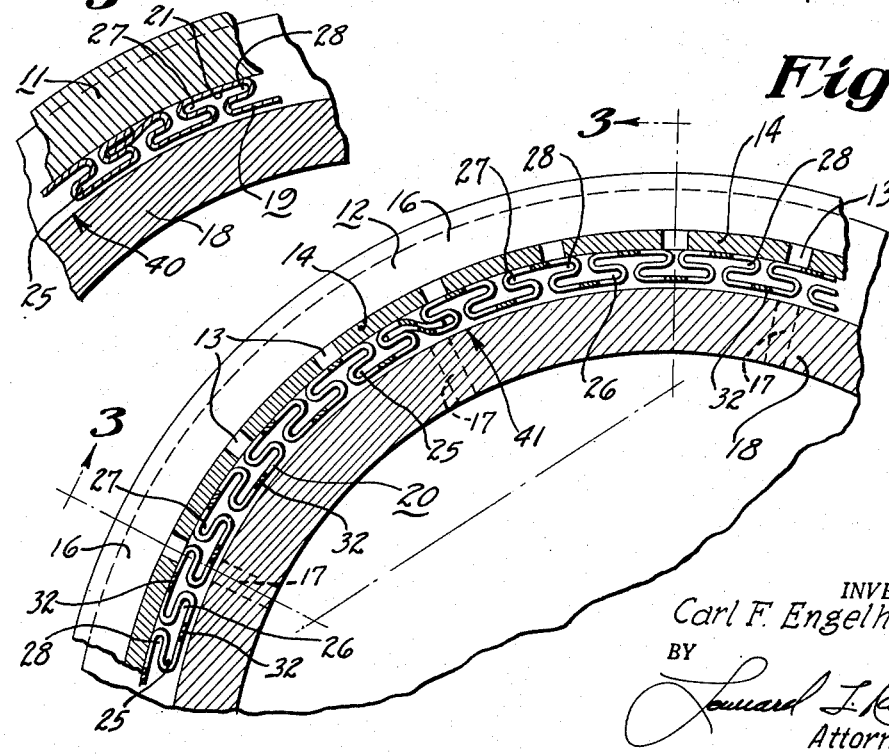
INVENTOR.
Carl F. Engelhardt
BY
Leonard J. Kalish
Attorney April 21, 1953     C. F. ENGELHARDT     2,635,933
PISTON RING CONSTRUCTION
Filed Sept. 28, 1949     3 Sheets-Sheet 3
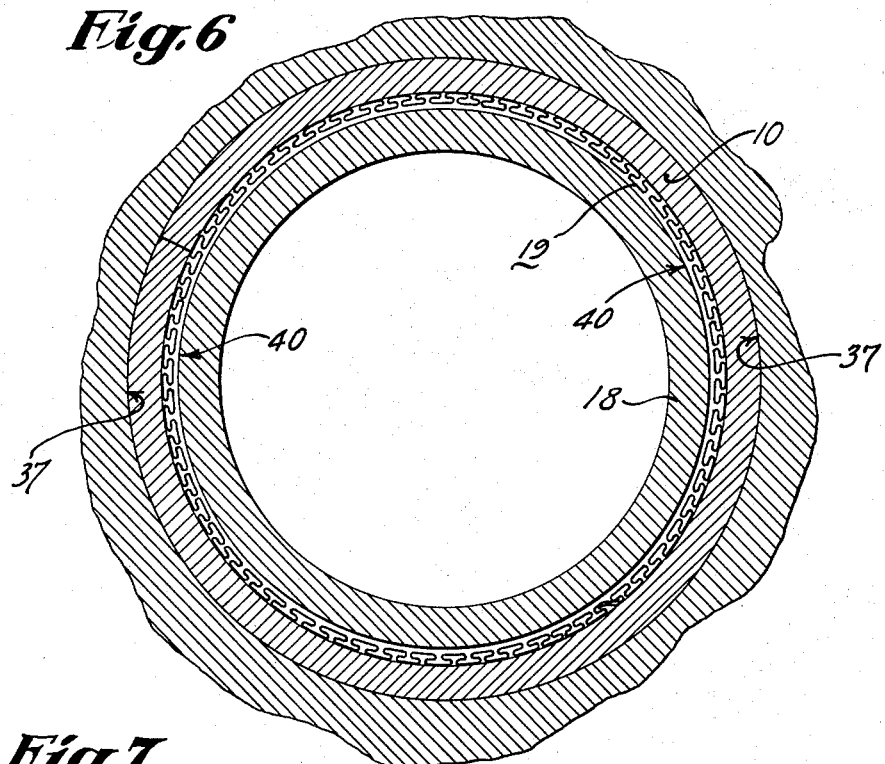
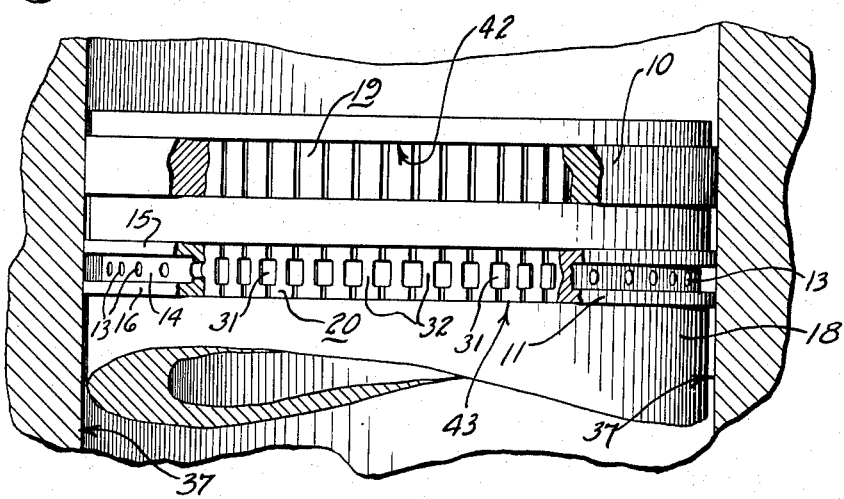
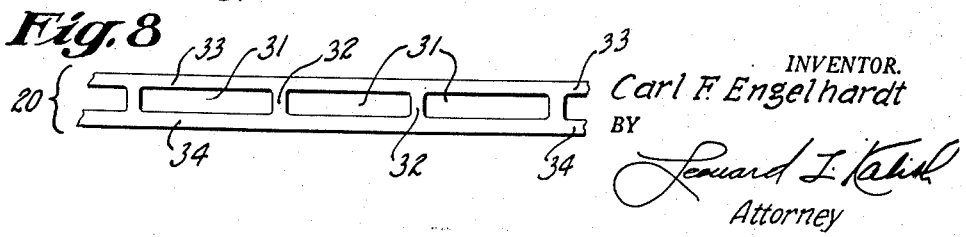
INVENTOR.
Carl F. Engelhardt
BY
Leonard I. Kahn
Attorney Patented Apr. 21, 1953

2,635,933

UNITED STATES PATENT OFFICE 2,635,933

PISTON RING CONSTRUCTION

Carl F. Engelhardt, Yeadon, Pa., assignor to Wilkening Manufacturing Company, Philadelphia, Pa., a corporation of Delaware Application September 28, 1949, Serial No. 118,390

5 Claims. (Cl. 309—45)

The present invention relates to a composite piston-ring construction, either for compression or oil control purposes in internal combustion engines and the like, and it relates more particularly to a composite piston-ring construction in which the sealing ring is relatively flexible so that it may conform to any slight out-of-roundness of the cylinder and generally better to fit any cylinder.

The composite piston-ring construction of the present invention includes a split sealing ring which may be either solid in cross-section, as for compression purposes, or grooved and perforated for oil control purposes, and a non-bottoming expander-spring within the sealing ring and exerting generally uniform outward radial pressure upon the sealing ring, developed solely by the tangential or circumferential compression of the spring.

The present invention consists more particularly of a combination of a sealing ring and non-bottoming expander-spring having the same general over-all axial width as that of the ring and bearing against the inner periphery of the sealing-ring throughout its axial width, and formed of a successive series of closely adjacent inner and outer flat loops of a continuous strip of a thin flat band or ribbon of spring-steel or other spring metal, with the terminal loops at the two ends of the expander-spring abutting each other and interlocked with each other so that when the expander spring is compressively confined by the sealing-ring, it will be compressed circumferentially and thus exert a radial outward force upon the sealing-ring.

The present invention further consists of other novel features which will appear more fully from the following description and accompanying drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the accompanying drawings in which like reference characters indicate like parts, Figure 1 represents a fragmentary perspective view of a composite compression ring in accordance with the present invention.

Figure 3 represents a fragmentary vertical cross-sectional view of a cylinder and piston with a composite compression ring embodying the present invention in the upper ring-receiving groove of the piston and with a composite oil-control ring embodying the present invention in the lower ring-receiving groove of the piston; Figure 3 being a cross-sectional view generally on line 3—3 of Figure 4.

Figure 4 represents a cross-sectional view on line 4—4 of Figure 3, showing the composite oil-control ring.

Figure 5 represents a fragmentary cross-sectional view similar to that shown in Figure 4, but showing the composite compression ring.

Figure 6 represents a horizontal cross-sectional view on line 6—6 of Figure 3, on a reduced scale, showing the entire circumference of the structure.

Figure 7 represents a fragmentary side elevational view of a piston in a cylinder (the cylinder being in cross-section) and of a composite compression ring and of a composite oil-control ring embodying the present invention, with the sealing rings partly broken away so as to expose to view, in side elevation, the expander-springs within the sealing-rings.

Figure 8 represents a fragmentary portion of the flat ribbon or band of spring-steel or other spring metal, with the holes punched therein, and before it is bent into the inner and outer spring-loops shown in Figures 2 and 4.

According to the present invention the sealing-ring whether the solid compression ring 11 or the grooved apertured oil-control ring 12, is of sufficiently small radial dimension as to be relatively flexible. The rings 11 and 12 are preferably not given any inherent outward tension or resilience.

Figure 2:
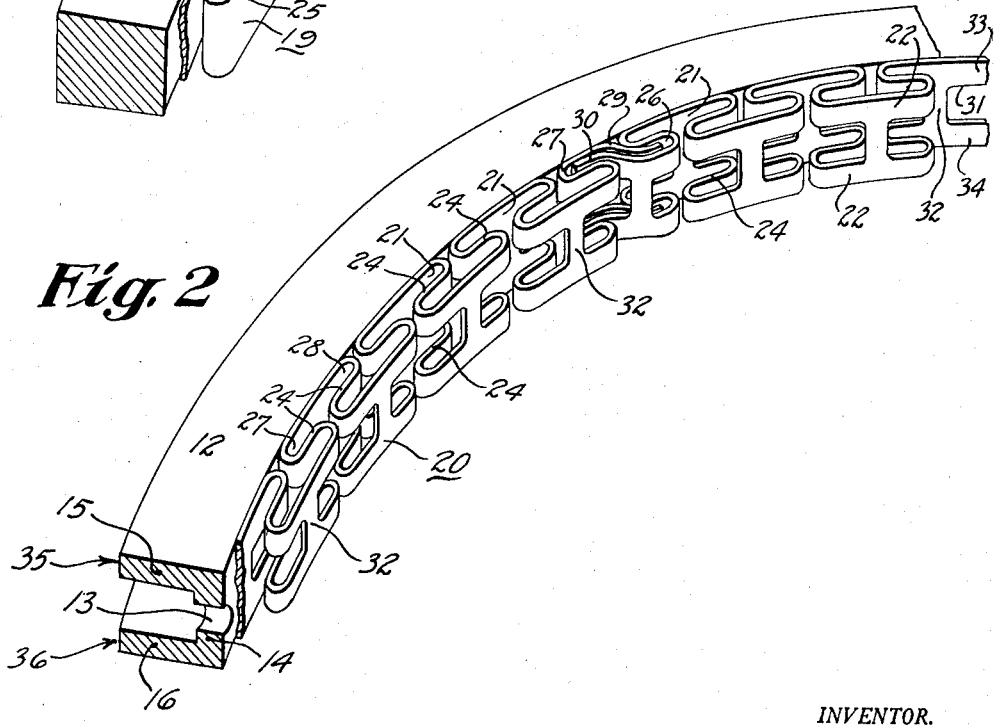
Figure 2 represents a fragmentary perspective view of a composite oil-control ring in accordance with the present invention.

The oil-control sealing-ring may be generally U-shaped in cross-section as indicated in Figures 2, 3 and 7, with oil-drain passageways or holes 13 at intervals through the central web 14 thereof, so that the oil which collects between the flanges 15 and 16 may drain through the holes 13 and thence through the drain-aperture 17 extending from the inner wall 41 of the groove 43 through the piston wall 18.

Figure 1:
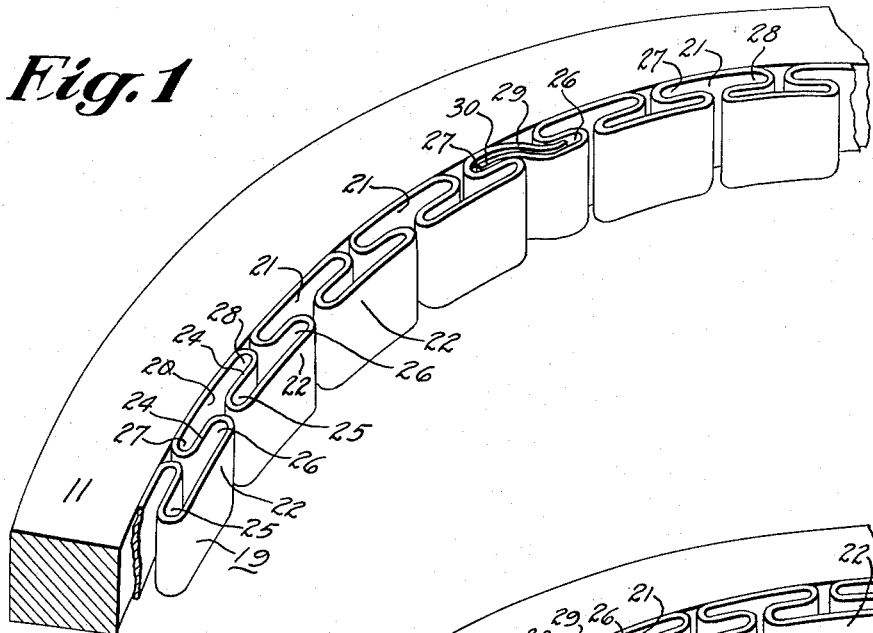

The expander-springs designated generally by the numerals 19 and 20, respectively, are formed of a thin flat band or ribbon of spring-steel or other suitable spring metal, which is bent back upon itself, alternately in opposite directions, in the manner shown particularly in Figures 1, 2, 4, 5 and 6, to form outer flat circumferentially-extending loops 21 and similar inner flat circumferentially-extending loops 22, which are arranged in staggered relation to each other, and which have the intermediate circumferentially-extending connecting webs or portions 24 in common. Each of the loops thus includes a pair of opposed and facing U-bends, as, for instance, U-bends 25 and 26 of the inner loops and U-bends 27 and 28 of the outer loops. The free ends 29 and 30 of the expander spring are inserted into the terminal U-bends 27 and 26 either in the manner indicated in Figures 1, 2 and 4 or in the manner indicated in Figure 5. In Figures 1, 2 and 4 both ends 29 and 30 are bent slightly and each is inserted into the opposed U-bend, while in Figure 5 only one of the ends is inserted into the terminal U-bend, while the other end is free. In the form shown in Figure 5 it is not necessary to deform or re-shape the ends, in order to effect the abutting juncture between the ends.

In the oil-control embodiment of the present invention, the spring-band is preferably perforated in the manner shown in Figure 8, before it is formed into the outer and inner loops 21 and 22; the perforations 31 being preferably elongated in the manner shown in Figure 8 so as to leave but small connecting webs 32 to connect the remaining upper and lower portions 33 and 34 of the spring-band or spring-ribbon. The distance between the webs 32 is so arranged that alternate webs 32 will preferably be centrally disposed in the outer and inner loops 21 and 22 respectively, in the manner shown particularly in Figures 2 and 4. This provides both ample clearance for the passage of oil through the expander-spring and also serves to weaken and render the spring more flexible and thus permit the control of the radial pressure (per unit of area) exerted between the cylinder-contacting surfaces 35 and 36 of the oil-control sealing-ring 12 and cylinder-wall 37. Thus by varying the width and length of the apertures 31, the radial pressure (per unit of urea) between cylinder-contacting surfaces 35 and 36 and cylinder-surface 37 may be similarly varied according to operating requirements of engine.

The expander-spring, whether of the imperforate or solid type of ring 19 shown in Figure 1 or of the perforated type shown in Figure 2, has an over-all axial width substantially the same as that of the sealing ring and the outer loops 21 bearing directly against the inner circumference of the sealing ring while the spring is under circumferential compression.

The circumferential dimension of the expander-spring, when not compressed (but with its ends abutting as in Figures 1, 2, 4 and 5) is such that its outermost circumference, namely, at the outer surface of the outer loops 21, will be slightly greater than the circumference of the inner diameter of the sealing-ring when the outer circumference of the sealing-ring is in contact with the cylinder-wall. When the sealing-ring (11 or 12) is then placed over the expander-spring, and is collapsed to cylinder-diameter, the expander-spring (19 or 20) will be slightly compressed circumferentially. This compression will slightly deform the U-bends 25, 26, 27 and 28, probably slightly closing each such U formation against the resiliency of the metal. This will cause an outward radial pressure to be exerted by the outer walls of the outer walls of the outer loops 21 against the inner diameter of the sealing-ring, without the expander-spring being bottomed on or any way contacting the "bottom" or inner walls 40 and 41 of the ring-receiving grooves 42 and 43.

Because the expander-spring is not "bottomed" or does not contact the inner wall of the ring-receiving groove, a greater uniformity in the distribution of outward radial pressure is obtained on the sealing-ring, because the radial pressure is not dependent upon the force of any one of the U-bends, nor upon the equality of contact with groove-bottom, at all points. Thus high and low pressure spots of the sealing-ring are eliminated and a uniform outward radial pressure is obtained throughout the circumference of the sealing-ring.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, I claim, and desire to secure by Letters Patent, the following:

1. For use in a piston-groove; a cylinder-contacting piston-ring and a non-bottoming flat spring-ribbon expander-spring having inner and outer circumferentially-extending loops in staggered relation to each other, each of said loops being formed by a pair of opposed and facing U-bends and having common circumferentially-extending connecting webs disposed generally parallel to said inner and outer loops the ends of said expander-spring being disposed in abutting relationship to provide a generally continuous annulus having inherent circumferential and radial resilience; the uncompressed outer circumference of said annulus being slightly greater than the inner circumference of the piston-ring when the latter is in cylinder-contacting position whereby said expander-spring exerts outward radial tension upon said piston-ring.

2. For use in a piston-groove; a cylinder-contacting piston-ring and a non-bottoming flat spring-ribbon expander-spring having inner and outer circumferentially-extending loops in staggered relation to each other, each of said loops being formed by a pair of opposed and facing U-bends, and having common circumferentially-extending connecting webs disposed generally parallel to said inner and outer loops, at least one end of said expander-spring being abuttingly disposed within the open U-bend at the other end of said expander-spring to provide a generally continuous annulus having inherent circumferential and radial resilience; the uncompressed outer circumference of said annulus being slightly greater than the inner circumference of the piston-ring when the latter is in cylinder-contacting position whereby said expander-spring exerts outward radial tension upon said piston-ring.

3. For use in a piston-groove with a cylinder-contacting piston-ring; a non-bottoming expander-spring integrally formed from an elongated strip of thin flat ribbon-steel or the like, said strip having its ends disposed in abutting relationship to provide a generally continuous annulus having inherent circumferential and radial resilience and being capable of exerting outward radial tension when installed behind and compressed by said piston-ring, said strip being oppositely reversely bent approximately 180° at circumferentially-spaced intervals to provide alternating inner and outer circumferentially-extending loops radially displaced from one to another and common circumferentially-extending connecting webs disposed radially intermediate said inner and outer loops disposed generally parallel to said inner and outer loops, the outer loops being constructed and arranged to bear against the inner periphery of said piston-ring.

4. For use in a piston-groove with a cylinder-contacting piston-ring; a non-bottoming expander-spring integrally formed from an elongated strip of thin flat ribbon-steel or the like, said strip having its ends disposed in abutting relationship to provide a generally continuous annulus having inherent circumferential and radial resilience and being capable of exerting outward radial tension when installed behind and compressed by said piston-ring, said strip being oppositely reversely bent approximately 180° at circumferentially-spaced intervals to provide alternating inner and outer circumferentially-extending loops radially displaced from one another and common circumferentially-extending connecting webs disposed radially intermediate said inner and outer loops disposed generally parallel to said inner and outer loops, the outer loops being constructed and arranged to bear against the inner periphery of said piston-ring, said strip having a plurality of circumferentially-distributed openings formed therein.

5. For use in a piston-groove with a cylinder-contacting piston-ring; a non-bottoming expander-spring integrally formed from an elongated strip of thin flat ribbon-steel or the like, said strip having its ends interlocked in abutting relationship to provide a generally continuous annulus having inherent circumferential and radial resilience and being capable of exerting outward radial tension when installed behind and compressed by said piston-ring, said strip being oppositely reversely bent approximately 180° at circumferentially-spaced intervals to provide alternating inner and outer circumferentially-extending loops radially displaced from one another and common circumferentially-extending connecting webs disposed radially intermediate said inner and outer loops disposed generally parallel to said inner and outer loops, the outer loops being constructed and arranged to bear against the inner periphery of said piston-ring, at least one of the ends of said strip being bent radially so as to nest inside the juxtaposed bent portion of said strip.

CARL F. ENGELHARDT.

References Cited in the file of this patent

UNITED STATES PATENTS

| Number | Name | Date |
|---|---|---|
| 345,767 | Buckley | July 20, 1886 |
| 1,767,711 | Solenberger | June 24, 1930 |
| 2,044,272 | Zahodiakin | June 16, 1936 |
| 2,183,199 | Lutz | Dec. 12, 1939 |
| 2,229,578 | Malpas | Jan. 21, 1941 |
| 2,293,450 | Wilkering | Aug. 18, 1942 |
| 2,333,457 | Zahodiakin | Nov. 2, 1943 |

FOREIGN PATENTS

| Number | Country | Date |
|---|---|---|
| 22,862 | Great Britain | of 1891 |